United States Patent Office 3,373,025
Patented Mar. 12, 1968

1

3,373,025
ESTROGENIC COMPOUNDS AND ANIMAL GROWTH PROMOTERS

Edward B. Hodge, Phil H. Hidy, and Herbert L. Wehrmeister, Terre Haute, Ind., assignors to Commercial Solvents Corporation, a corporation of Maryland No Drawing. Continuation-in-part of application Ser. No. 432,812, Feb. 15, 1965. This application Mar. 3, 1967, Ser. No. 620,259
10 Claims. (Cl. 99—2)

ABSTRACT OF THE DISCLOSURE

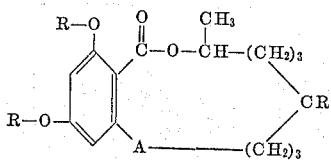

where R is hydrogen or benzyl, at least one R being benzyl, A is $—CH_2CH_2—$ or $—CH{=}CH—$, and

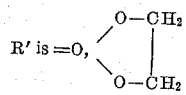

or =NOH, and animal feeds containing growth promoting amounts thereof.

The present invention is a continuation-in-part of application Ser. No. 432,812, filed Feb. 15, 1965, now Patent No. 3,239,341 and Ser. No. 532,113, filed Mar. 7, 1966, now abandoned.

The present invention relates to new compounds and an object of the present invention is to provide a compound which exhibits estrogenic activity or aids in increasing the rate of growth in meat-producing animals, e.g., cattle, lamb and swine and/or is useful as an intermediate in producing compounds which exhibit such activity.

A conventional formula for the compounds of the present invention is:

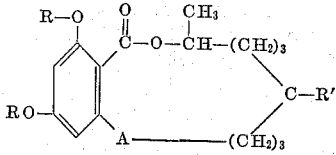

wherein R is hydrogen or benzyl, at least one R being benzyl, A is $—CH_2—CH_2—$ or $—CH{=}CH—$, and

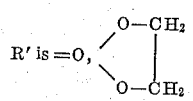

or =NOH.

The compounds can be administered to animals by any suitable method including oral and parenteral administrations. For example, the compounds can be blended with ordinary feed containing nutritional values in an amount sufficient to produce the desired rate of growth and thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with

2 a compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compound of the present invention can be produced from the compound:

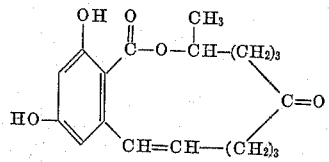

hereinafter referred to as the fermentation estorgenic substance (F.E.S.), by replacement of the H atom of the OH group on the benzene ring of F.E.S. para to the ester group with a benzyl group. The nomenclature used herein is based upon the F.E.S. compound. The compound of this invention is also useful in the production of the F.E.S. acetals defined in copending application Ser. No. 432,897, now Patent No. 3,239,357, since it may be desirable to protect the hydroxyl groups of F.E.S. with a benzyl group during the production of the F.E.S. acetals. The p-monobenzyl F.E.S. acetals can be reconverted to F.E.S. acetals as desired.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL–2830.

EXAMPLE I

A spore sand culture containing *Gibberella zeae* (Gordon) NRRL–2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produce F.E.S.

EXAMPLE II

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

EXAMPLE III

A 300 gram portion of fermented material produced by the method of Example II was placed in 500 milliliters of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

The following example illustrates the production of p-monobenzyl F.E.S. having the benzyl group replacing the hydrogen in the OH group para to the ester group of F.E.S.

EXAMPLE IV

F.E.S. in an amount of 2 grams was refluxed with 50 milliliters of acetone, 2 grams potassium carbonate and 2 milliliters of benzyl chloride for 8 hours. The following day the solution was filtered. The filtrate was concentrated to about 5 milliliters, cooled and again filtered yielding 0.84 gram of a product having a melting point of 147–151° C. This product was recrystallized from 35 milliliters isopropyl alcohol to give 0.56 gram p-monobenzyl F.E.S. having a melting point of 153–155° C. and analyzing:

Calculated: C, 73.51%; H, 6.91%. Found: C, 73.62%; H, 7.14%.

The following example illustrates the production of p-monobenzyl F.E.S. acetal.

EXAMPLE V

The p-monobenzyl F.E.S. of Example IV in an amount of 2 grams was refluxed for 24 hours in 100 milliliters benzene, 0.2 gram paratoluene sulphonic acid and 5 milliliters ethylene glycol using a trap to separate water. The solution was first washed with 100 milliliters of a 5% solution of sodium bicarbonate and then washed with 100 milliliters water. Thereafter the solution was concentrated to dryness at reduced pressure. The residue was dissolved in 25 milliliters of isopropyl alcohol, cooled and 10 milliliters of water were added. The solution was cooled for an additional 4 hours and filtered yielding 2.14 grams of product having a melting point above 108° C. This initial product was recrystallized from 75 milliliters ethanol to give 1.5 grams p-monobenzyl F.E.S. acetal having a melting point of 110–112° C. and analyzing:

Calculated: C, 71.66%; H, 7.13%. Found: C, 70.80%; H, 6.93%.

The following example illustrates regeneration of the hydroxyl group to produce F.E.S. acetal from p-monobenzyl F.E.S. acetal.

EXAMPLE VI

A solution of 200 milliliters ethanol, 2 grams p-monobenzyl F.E.S. acetal and 10 grams of a suspension of Raeney nickel in water was reduced for 8 hours at 50 p.s.i. hydrogen in a shaking bomb. The solution was then filtered and concentrated to 25 milliliters whereupon 15 milliliters of water were added and the solution evaporated slowly in air for a few minutes. Thereafter, the solution was cooled 4 hours and filtered to yield 1.16 grams of product having a melting point of 125–145° C. which was recrystallized from 20 milliliters ethanol and 15 milliliters water. The recrystallized product was evaporated in a current of air to assist in recrystallization and thereafter cooled and filtered, yielding 0.83 gram of F.E.S. acetal having a melting point of 125–126° C. and analyzing:

Calculated: C, 65.91%; H, 7.74%. Found: C, 66.19%; H, 7.66%.

EXAMPLE VII

Six head of cattle are fed a daily ration including a mixture of alfalfa hay and ground corn cobs containing from 1 to 20 ounces of p-monobenzyl F.E.S. per hundred pounds of ration.

The following example illustrates the preparation of o-monobenzyl F.E.S. or 2-benzyl F.E.S.:

EXAMPLE VIII

To 100 milliliters of methanol was added 5.0 grams of F.E.S., 5.0 milliliters of benzyl chloride, and 3.0 grams of powdered potassium carbonate. The mixture was refluxed for 30 minutes and evaporated to dryness. The residue was stirred for 30 minutes with 200 milliliters of 5% sodium hydroxide solution which was then filtered, extracted with 100 milliliters of benzene, and acidified. The precipitate formed on acidification was recrystallized from 20 milliliters of isopropyl alcohol plus 10 milliliters of water and then from 20 milliliters of isopropyl alcohol to give 0.41 gram, M.P. 167–169° C., of 2-benzyl F.E.S.

EXAMPLE IX

This example illustrates the preparation of dibenzyl F.E.S.

A mixture of 1.00 gram of 4-benzyl F.E.S., 1.0 milliliters of benzyl chloride, 1.0 gram of potassium carbonate and 50 milliliters of methanol was refluxed for 4 hours, then left overnight. Filtration gave 1.14 grams of impure product. This was recrystallized from 35 milliliters of isopropyl alcohol to give 0.7 gram of crystals, M.P. 129–131° C., of dibenzyl F.E.S. Calc. C, 77.08; found C, 77.66; Calc. H, 6,87; found H, 6.86.

EXAMPLE X

This example illustrates the preparation of the oxime of p-monobenzyl F.E.S. (4-benzyl F.E.S.) of Example IV.

To 2.0 grams of 4-benzyl F.E.S. in 20 milliliters of pyridine was added 1.5 grams of hydroxylammonium chloride and 50 milliliters of ethanol. The mixture was refluxed for 2 hours, then concentrated to dryness, stirred with 50 milliliters of water, then separated and dissolved in 55 cc. of hot isopropyl alcohol. The hot isopropyl alcohol was filtered, mixed with 10 milliliters of water and concentrated to about 35 milliliters. Cooling and filtration gave 1.7 grams, M.P. 152–164° C. Recrystallization from 50 milliliters of isopropyl alcohol by addition of 25 milliliters of water gave 1.44 grams, M.P. 161–163° C., Calc. N, 3.31; found N, 3.40

The following are specific examples of animal feed compositions of this invention useful for increasing the rate of growth and feed efficiency of young animals to market weight.

EXAMPLE XI

For young beef cattle, i.e., calves to yearlings running to two year olds, each animal is given 5 to 20 milligrams per day of the compound produced in Example IV intimately admixed in about 18 to 22 pounds per head per day of a complete pelleted ration for about 180 days. The completed pelleted ration includes in addition to the compound of Example IV the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | I.U./ton | 2–4 |

Note: Milo or corn, for example, can be substituted for the barley.

The compound of Example IV is admixed with the above ingredients in a stationary blender or a feed mix truck in the following amounts in grams per ton to provide an appropriate complete pelleted feed with dosage levels ranging from 5 to 90 milligrams per head per day.

| Grams ton: | Mg. head/day |
|---|---|
| .5 | 5 |
| 1.0 | 10 |
| 2.0 | 20 |
| 4.0 | 40 |
| 8.0 | 80 |

These grams amounts are premixed with, for example, 10 pounds of soybean hulls prior to admixture with the other ingredients.

EXAMPLE XII

For young swine, i.e., six week old pigs to about 100 pound pigs, each animal is given 5 to 20 milligrams per day of the compound of Example VIII intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example VIII intimately admixed in about 5½ to 10 pounds per head per day of a finisher ration until it reaches market weight of about 220 pounds. The grower and finisher ration include in addition to the compound of Example VIII the following:

| | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example VIII is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

EXAMPLE XIII

For 4 to 10 month old lambs weighing 50 to 70 pounds, each animal is given 1 to 15 milligrams per day of the compound of Example IX intimately admixed in about 3 to 6 pounds per head per day of a complete ration for 30 to 90 days. The complete ration includes in addition to the compound of Example IX the following:

| | No. |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example IX is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

EXAMPLE XIV

For broilers, i.e., day old to four weeks old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example IV in the grower and finisher feed each of which includes in addition to the compound of Example IV the following:

| | Grower (lbs.) | Finisher (lbs.) |
|---|---|---|
| Ground Yellow Corn | 1,000 | 1,200 |
| Soybean Meal (44% Protein) | 100 | 500 |
| Fish Meal (60% Portein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins Trace Minerals and Antibiotics | 10 | 10 |

We claim:

1.

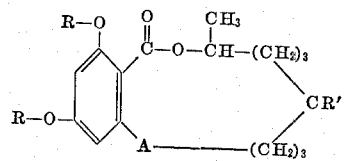

wherein R is a hydrogen or benzyl, at least one R being benzyl, A is —$CH_2$—$CH_2$— or —CH=CH—, and R' is =O, 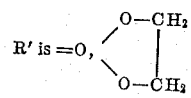

or =NOH.

2.

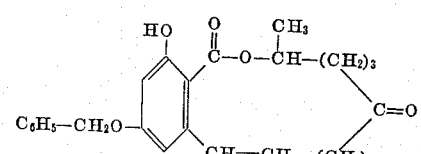

3.

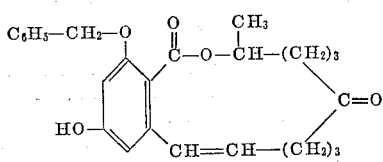

4.

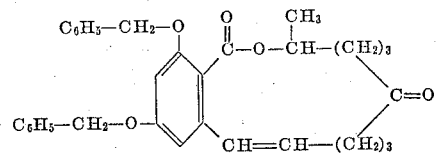

5.

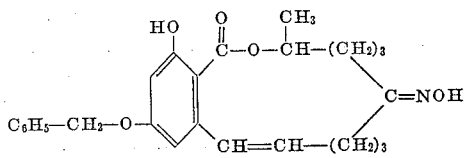

6.

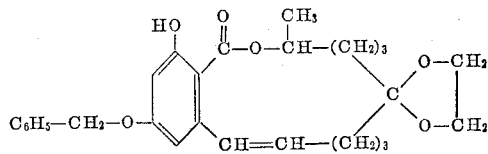

7. An animal feed comprising a nutritional diluent and growth promoting amounts of the compound of claim 1.
8. An animal feed comprising a nutritional diluent and growth promoting amounts of the compound of claim 2.
9. An animal feed comprising a nutritional diluent and growth promoting amounts of the compound of claim 3.
10. An animal feed comprising a nutritional diluent and growth promoting amounts of the compound of claim 4.

No references cited.

A. LOUIS MONACELL, *Primary Examiner.*

H. H. KLARE, *Assistant Examiner.*

UNITED STATES PATENT OFFICE
CERTIFICATE OF CORRECTION

Patent No. 3,373,025 March 12, 1968

Edward B. Hodge et al

It is certified that error appears in the above identified patent and that said Letters Patent are hereby corrected as shown below:

Column 1, line 34, "3,239,341" should read -- 3,239,342 --. Column 2, line 21, "estorgenic" should read -- estrogenic --; Column 4, line 4, "Raeney" should read -- Raney --; line 51, "6,87" should read -- 6.87 --. Column 5, line 15, "I.U./ton" should read -- M.M.I.U./ton --; line 24, "Grams" should read -- Grams/ --; same line 24, "Mg." should read -- Mg./ --. Column 6, line 3, "No." should read -- Lbs. -- line 43, "portein" should read -- protein --; same column 6, lines 62 to 65, in the formula, cancel "R′ is" and insert the same after "and" in line 61, same column 6.

Signed and sealed this 10th day of March 1970.

(SEAL)
Attest:

Edward M. Fletcher, Jr.
Attesting Officer

WILLIAM E. SCHUYLER, JR.
Commissioner of Patents